United States Patent [19]
Baginski

[11] Patent Number: 5,730,399
[45] Date of Patent: Mar. 24, 1998

[54] METHOD AND ASSEMBLY FOR MOUNTING SERVICE LINES

[75] Inventor: Frank T. Baginski, Kernersville, N.C.

[73] Assignee: Volvo GM Heavy Truck Corporation, Greensboro, N.C.

[21] Appl. No.: 604,711

[22] Filed: Feb. 21, 1996

[51] Int. Cl.$^6$ .................................................. F16L 3/22
[52] U.S. Cl. ..................... 248/58; 24/16 PB; 248/68.1; 248/71; 248/73; 248/74.3
[58] Field of Search .......................... 248/58, 68.1, 71, 248/73, 74.1; 24/16 PB; 248/317, 320, 321

[56] References Cited

U.S. PATENT DOCUMENTS

| | | |
|---|---|---|
| 2,963,539 | 12/1960 | Hynes .................... 248/68.1 X |
| 3,009,220 | 11/1961 | Fein . |
| 3,250,505 | 5/1966 | Rodman, Sr. et al. . |
| 3,302,913 | 2/1967 | Collyer et al. . |
| 3,432,129 | 3/1969 | Santucci . |
| 3,486,725 | 12/1969 | Hidassy . |
| 3,550,219 | 12/1970 | Van Buren, Jr. . |
| 3,552,696 | 1/1971 | Orenick . |
| 3,575,367 | 4/1971 | Welsh et al. . |
| 3,913,876 | 10/1975 | McSherry . |
| 3,933,377 | 1/1976 | Arrowood . |
| 3,944,175 | 3/1976 | Kearney . |
| 4,033,534 | 7/1977 | Bergkvist . |
| 4,128,220 | 12/1978 | McNeel . |
| 4,131,257 | 12/1978 | Sterling ................... 248/68.1 X |
| 4,369,944 | 1/1983 | Hobart, Jr. . |
| 4,371,137 | 2/1983 | Anscher . |
| 4,379,537 | 4/1983 | Perrault et al. . |
| 4,386,752 | 6/1983 | Pavlak et al. . |
| 4,395,009 | 7/1983 | Bormke . |
| 4,510,650 | 4/1985 | Espinoza . |
| 4,557,023 | 12/1985 | Six et al. . |
| 4,572,466 | 2/1986 | Yamaguchi et al. . |
| 4,617,702 | 10/1986 | Diederich, Jr. . |
| 4,665,588 | 5/1987 | Nakano . |
| 4,688,302 | 8/1987 | Caveney et al. . |
| 4,705,245 | 11/1987 | Osada . |
| 4,708,306 | 11/1987 | Mitomi . |
| 4,735,387 | 4/1988 | Hirano et al. . |
| 4,768,741 | 9/1988 | Logsdon . |
| 4,784,358 | 11/1988 | Kohut . |
| 4,793,385 | 12/1988 | Dyer et al. . |
| 4,795,116 | 1/1989 | Kohut et al. . |
| 4,805,856 | 2/1989 | Nicoli et al. . |

(List continued on next page.)

OTHER PUBLICATIONS 5 sheets illustrating Hellermann CL8–SB6, CL8–SB8, and CL8–SB10 products and Behringer cable clamp, commercially available in the United States prior to Feb. 21, 1996. One sheet disclosing Tyton Part No.BT100 C and BT100L K Button Head Ties on sale in the United States prior to Feb. 21, 1995 and Tyton Part No. T120RSMOHIR K Stud Mount Ties on sale in the United States prior to Feb. 21, 1995.

*Primary Examiner*—Derek J. Berger
*Attorney, Agent, or Firm*—Watts, Hoffmann, Fisher & Heinke Co., L.P.A.

[57] ABSTRACT

A mount assembly provides for the mounting of service lines of a variety of types and sizes to a support structure, such as a frame rail for an over-the-highway truck or tractor, with relative ease. The mount assembly includes a mount having a saddle for securing the service line to the mount with a self-sizing tie and having a latch for securing the mount to the support structure. The strap of another tie may be inserted through an opening of the support structure and through an opening of the latch such that a ratchet positioned in relation to the latch opening engages at least one of a plurality of sloping teeth of the strap. A spacer of the mount provides a clearance area for the service line from the support structure so as to minimize or avoid any gathering of debris between the service line and the support structure and therefore minimize or avoid any chafing or corrosion of the service line or of the support structure. The mount assembly may be stacked with other mount assemblies to secure relatively more service lines to the support structure.

61 Claims, 4 Drawing Sheets

U.S. PATENT DOCUMENTS

| | | |
|---|---|---|
| 4,813,105 | 3/1989 | Espinoza . |
| 4,817,901 | 4/1989 | Kuo . |
| 4,819,897 | 4/1989 | Gooding . |
| 4,840,333 | 6/1989 | Nakayama ............................ 248/73 X |
| 4,874,908 | 10/1989 | Johansson . |
| 4,905,942 | 3/1990 | Moretti .................................. 248/68.1 |
| 4,919,373 | 4/1990 | Caveney et al. . |
| 4,925,136 | 5/1990 | Knott . |
| 4,944,475 | 7/1990 | Ono et al. . |
| 4,993,669 | 2/1991 | Dyer . |
| 4,997,011 | 3/1991 | Dyer et al. . |
| 5,040,751 | 8/1991 | Holub . |
| 5,042,114 | 8/1991 | Parrish . |
| 5,102,075 | 4/1992 | Dyer . |
| 5,112,013 | 5/1992 | Tolbert et al. . |
| 5,119,528 | 6/1992 | Ono et al. . |
| 5,121,524 | 6/1992 | Mortensen . |
| 5,131,613 | 7/1992 | Kamiya et al. . |
| 5,221,064 | 6/1993 | Hodges . |
| 5,224,244 | 7/1993 | Ikeda et al. . |
| 5,337,983 | 8/1994 | Mailey . |
| 5,352,855 | 10/1994 | Potter . |
| 5,368,261 | 11/1994 | Caveney et al. . |
| 5,385,321 | 1/1995 | Kume et al. . |
| 5,386,615 | 2/1995 | Bernard . |

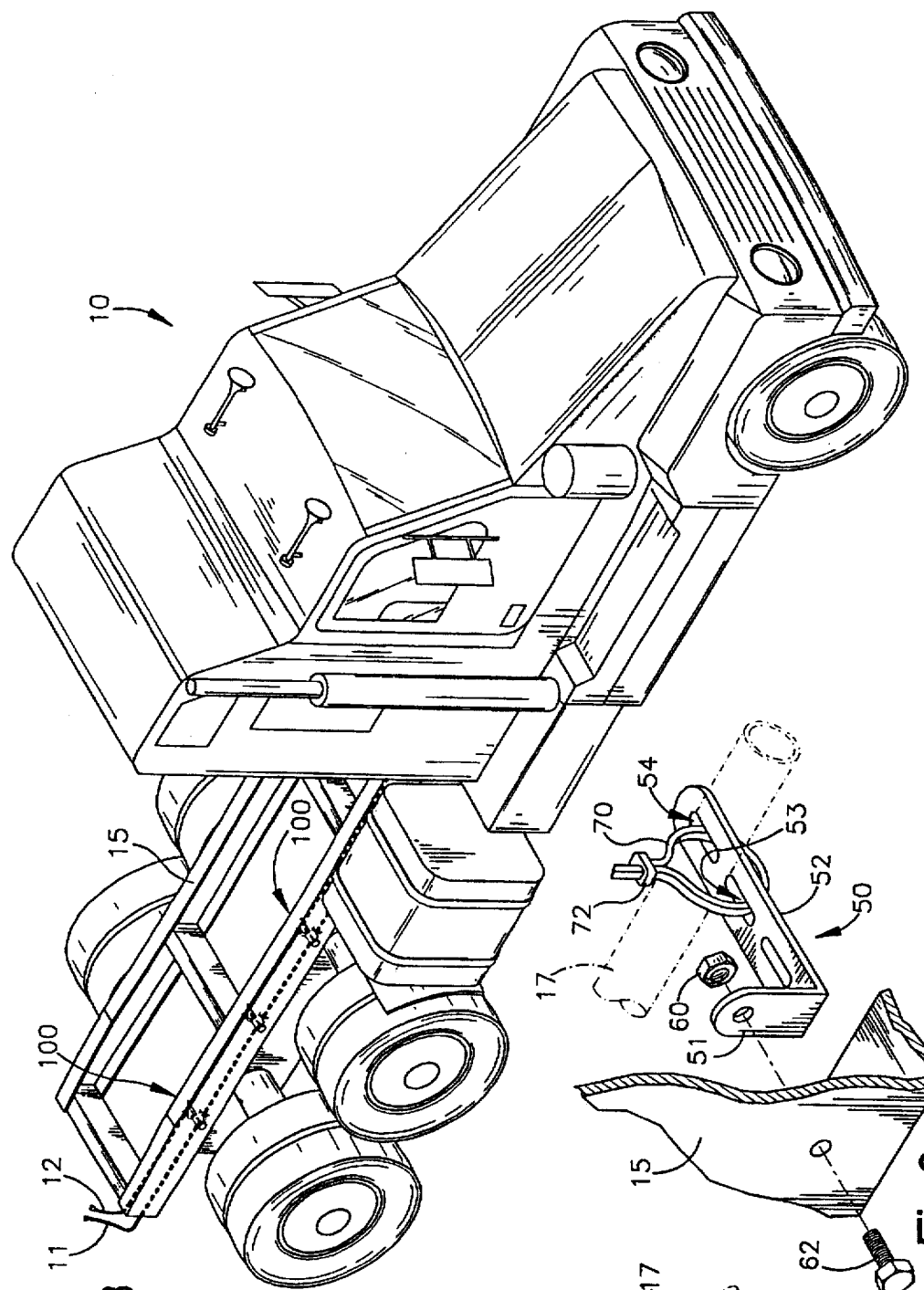
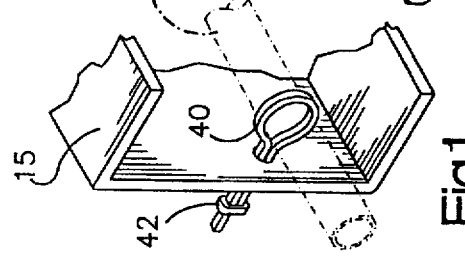

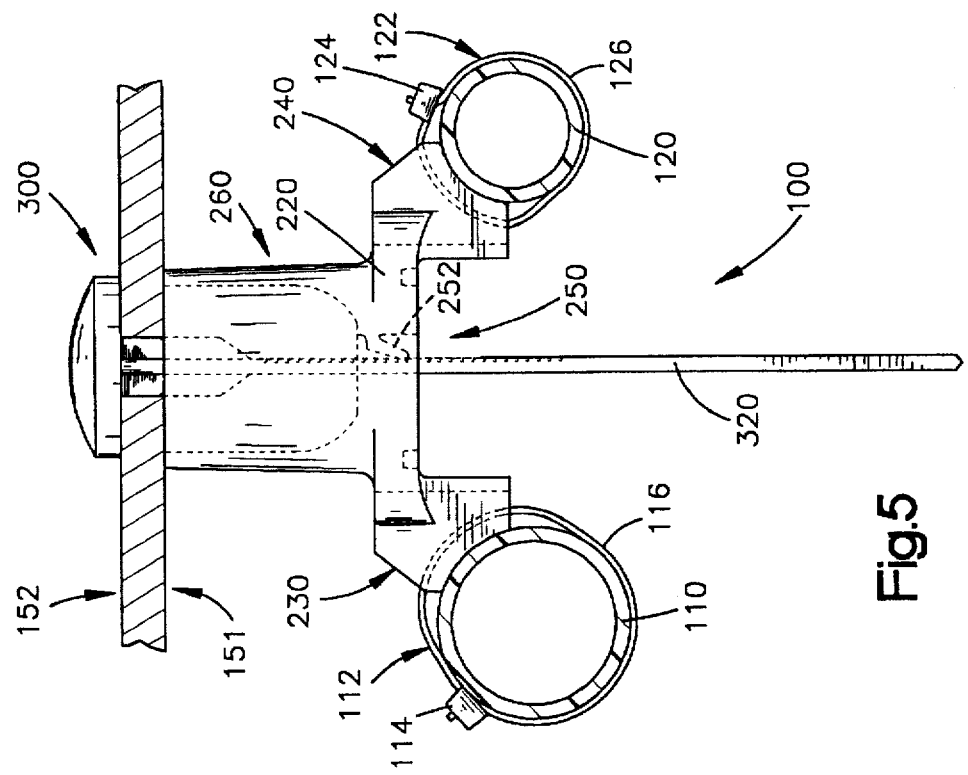
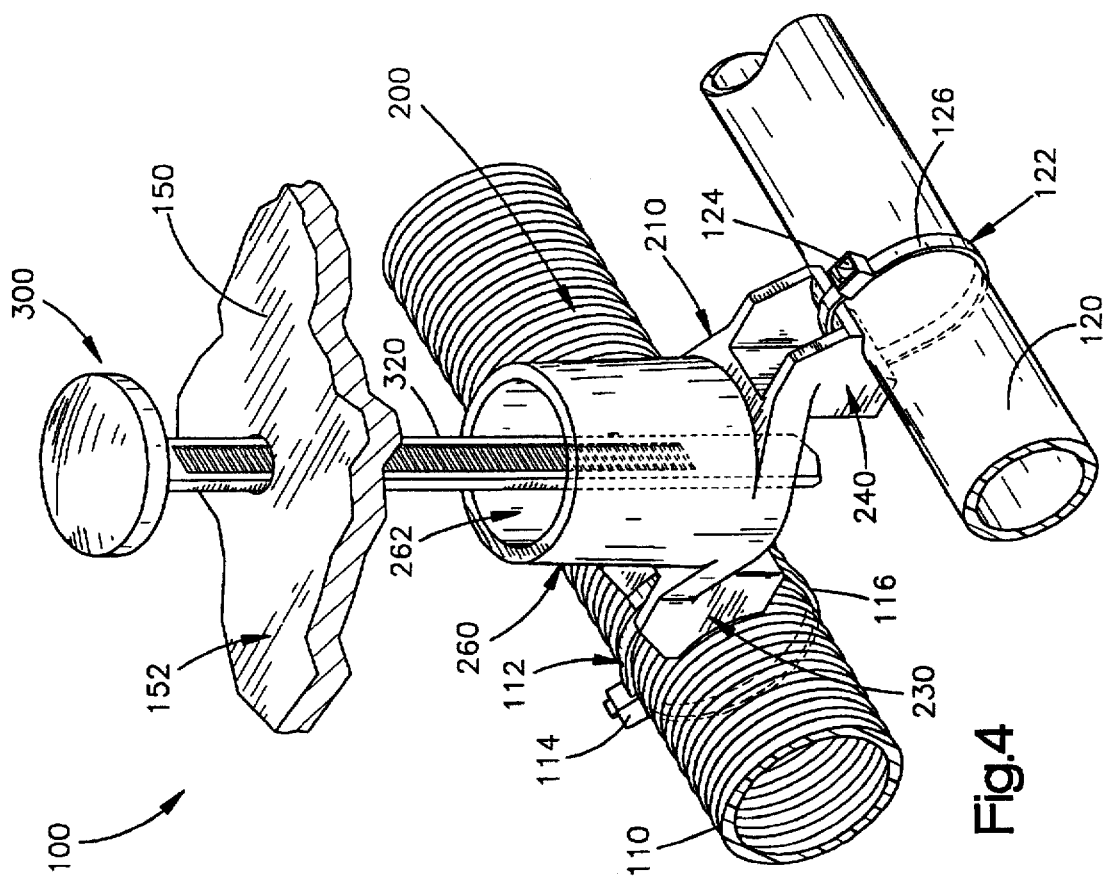

5,730,399

METHOD AND ASSEMBLY FOR MOUNTING SERVICE LINES

FIELD OF THE INVENTION

The present invention relates generally to the field of supports. More particularly, the present invention relates to the field of mounting supports for service lines.

BACKGROUND OF THE INVENTION

A variety of mounting supports are known for securing service lines to frame rails of over-the-highway trucks and tractors.

One prior art vehicle mounting support, as illustrated in FIG. 1, includes a tie 40 having a latch 42 at one end of the tie 40. The other end of the tie 40 is threaded through an opening in a frame rail 15, around a service line 17 to be mounted, back through the same opening, and through the latch 42 to secure the service line 17 to the frame rail 15. Because the tie 40 mounts the service line 17 closely to the surface of the frame rail 15, however, debris such as salt, dirt, and sand gather between the service line 17 and the frame rail 15 and chafe or corrode the frame rail 15 and the mounted service line 17.

Another prior art vehicle mounting support, as illustrated in FIG. 2, includes an L-shaped metal band 50 having one leg 51 secured to the frame rail 15 with a nut 60 and bolt 62 such that another leg 52 of the band 50 extends in a direction generally normal to the surface of the frame rail 15, as illustrated in FIG. 2. A tie 70 having a latch 72 at one end, similar to the tie 40 of FIG. 1, may then be used to mount the service line 17 to the leg 52 of the band 50 by threading the tie 70 through one opening 53 of the leg 52, back through another opening 54 of the leg 52, around the service line 17, and through the latch 72 to secure the service line 17 to the leg 52.

The prior art mounting support of FIG. 2 helps prevent the gathering of debris between the service line 17 and the frame 15 and hence any resultant chafing or corrosion. This mounting support, however, requires additional assembly as a separate tool must be used to secure the band 50 to the frame rail 15 with the nut 60 and bolt 62. Furthermore, the nut 60, the bolt 62, and the metal band 50 of this mounting support are prone to rust and corrosion.

SUMMARY OF THE INVENTION

One object of the present invention is to provide for a novel and improved mount assembly and method for mounting a service line to a support structure.

Another object of the present invention is to provide for a mount assembly and method for mounting a service line to a support structure with relative ease.

Another object of the present invention is to provide for a mount assembly and method for mounting a service line in a spaced relation to a support structure.

Another object of the present invention is to provide for a mount assembly and method for mounting a service line in over-the-highway trucks and tractors.

In accordance with the present invention, a method of mounting a service line to a support structure with a mount and a tie includes steps of securing the service line to a saddle of the mount, inserting a strap of the tie through an opening of the support structure, and latching the strap of the tie with a latch of the mount after the strap has been inserted through the opening of the support structure to secure the mount to the support structure. The support structure may be a frame rail of an over-the-highway truck or tractor.

The strap of the tie may be inserted through a spacer to define a spaced relation between the support structure and the service line secured to the mount. The strap of the tie may have a plurality of sloping teeth, and the strap may be inserted in a latch opening of the latch such that a ratchet positioned in relation to the latch opening engages at least one tooth of the strap. The tie may include a head coupled to an end of the strap, and the strap of the tie may be tensioned such that the head and the mount are held against opposing surfaces of the support structure to secure the mount to the support structure.

To secure the service line against a seat of the saddle, another tie may be inserted through a saddle opening of the saddle and wrapped around the service line. Another service line may also be secured to another saddle of the mount. Also, another mount having at least one other secured service line may be mated in a groove formed in the mount.

Also in accordance with the present invention, a mount assembly for mounting a service line to a support structure includes a tie and a mount for supporting the service line. The tie may be inserted through an opening of the support structure. The mount includes a saddle for securing the service line to the mount and a latch for receiving the tie inserted through the opening of the support structure and for securing the mount to the support structure with the tie. The tie and the mount may each be formed of nylon. The support structure may be a frame rail of an over-the-highway truck or tractor.

The tie may have a strap having a plurality of sloping teeth for insertion through an opening of the support structure. To secure the mount to the support structure, the latch may receive the strap inserted through the opening of the support structure and engage at least one tooth of the received strap. The latch may include a latch opening and a ratchet positioned in relation to the latch opening to receive the strap of the tie in the latch opening such that the ratchet engages at least one tooth of the strap. The tie may also include a head coupled to an end of the strap for securing the mount to the support structure when the strap is tensioned by the latch to hold the head and the mount against opposing surfaces of the support structure.

The mount may include a spacer coupled to the latch for defining a spaced relation between the support structure and the service line secured to the mount. The spacer may have a mouth and define an interior region exposing the latch through the mouth such that the tie may be inserted through the mouth of the spacer and received by the latch. The spacer may be cylindrical in shape.

The saddle may include a seat and may define a saddle opening. The mount assembly may include another tie for mounting the service line to the saddle by inserting the other tie through the saddle opening and wrapping the other tie around the service line to secure the service line against the seat of the saddle. The mount may include another saddle for securing another service line to the mount. Also, the mount may define a groove surrounding the latch for mating with another mount having at least one other secured service line.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 1 is a perspective view of a prior art vehicle mounting support for mounting a service line to a frame rail;

FIG. 2 is a perspective view of another prior art vehicle mounting support for mounting a service line to a frame rail;

FIG. 3 is a perspective view of an over-the-highway tractor having service lines mounted to a frame rail with a mount assembly in accordance with the present invention;

FIG. 4 is an exploded, perspective view of the mount assembly of FIG. 3;

FIG. 5 is a front, elevational view of the mount assembly of FIG. 4;

DETAILED DESCRIPTION

Figure 6:
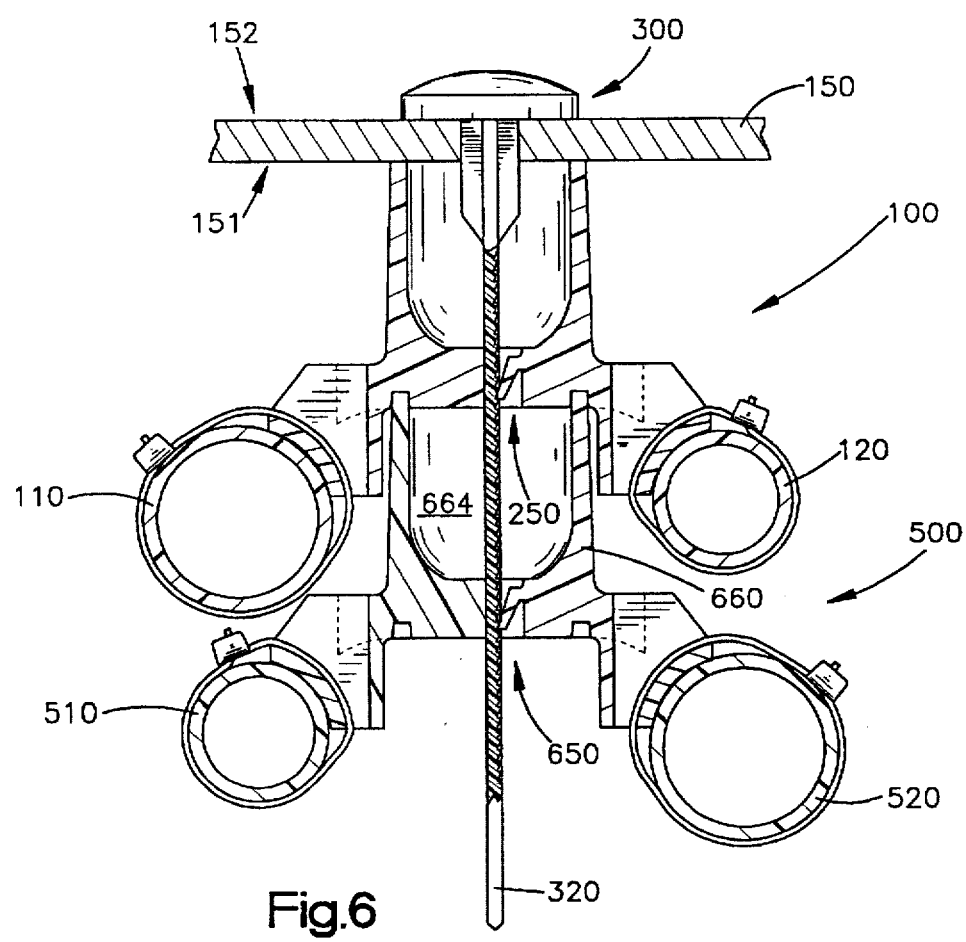
FIG. 6 is a front, cross-sectional view of stacked mount assemblies for mounting a service line to a support structure in accordance with the present invention.

FIG. 3 illustrates an over-the-highway tractor 10 having service lines 11 and 12 mounted to a frame rail 15 of the tractor 10 with a mount assembly 100. The service lines 11 and 12 carry electrical wiring for brake, turn, and trailer lights. Although illustrated in FIG. 1 as mounting the service lines 11 and 12 to the frame rail 15 of the tractor 10, the mount assembly 100 may be used to mount any suitable service lines to any suitable support structure, such as to the band 50 of FIG. 2, to cross-members between frame rails, and to tractor cab skin surfaces for example.

FIGS. 4 and 5 illustrate the mount assembly 100 mounting a first service line 110 and a second service line 120 to a support structure 150. The support structure 150 has a first surface 151 and a second surface 152 opposing the first surface 151. The mount assembly 100 includes a mount 200 for supporting the first and second service lines 110 and 120 and includes a tie 300 for securing the mount 200 to the support structure 150 by holding the mount 200 against the first surface 151 of the support structure 150.

As illustrated in FIGS. 7, 8, 9, and 10, the mount 200 has a top 201, a bottom 202, a front 203, a rear 204, a first side 205, and a second side 206. The mount 200 may have any suitable dimensions, and for one embodiment the mount 200 may have a height from the top 201 to the bottom 202 of approximately 41 millimeters, for example, and a length from the first side 205 to the second side 206 of approximately 54 millimeters, for example.

The mount 200 includes a mounting portion 210 having a base 220 near the bottom 202. The base 220 is generally circular in shape and may have any suitable dimensions. For one embodiment, the base 220 may have a width from the front 203 to the rear 204 of approximately 25 millimeters, for example.

Figure 7:
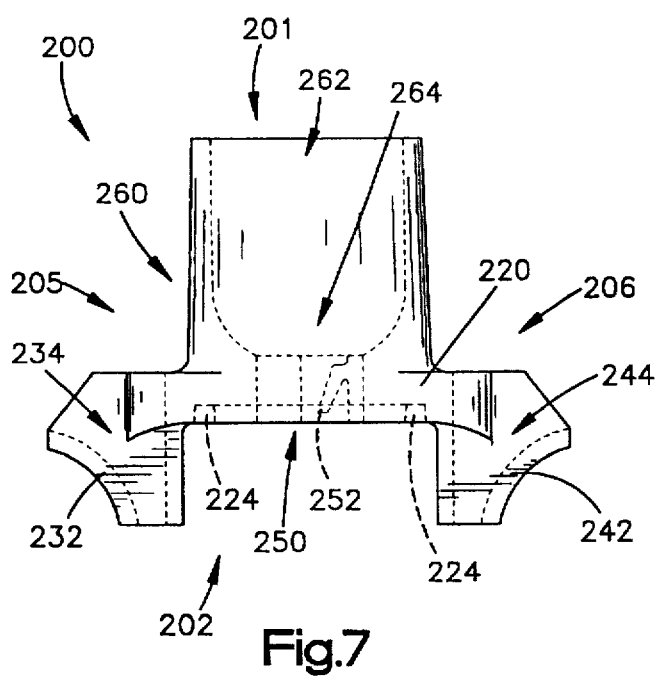
FIG. 7 is a front, elevational view of a mount for the mount assembly of FIGS. 4–6.

The mounting portion 210 includes a latch 250 positioned within the base 220 such that the latch 250 is generally flush with the bottom 202 of the base 220, as illustrated in FIGS. 5, 6, and 7. The latch 250 may have any suitable dimensions. For another embodiment, the latch may extend generally outward from the bottom 202 of the base 220 and may be formed, for example, such that the latch 250 extends approximately 8 millimeters from the bottom 202 of the base 220, has a length from the first side 205 to the second side 206 of approximately 10 millimeters, and has a width from the front 203 to the rear 204 of approximately 12 millimeters.

The mounting portion 210 also includes a first saddle 230 extending generally outward from the first side 205 of the base 220 and a second saddle 240 extending generally outward from the second side 206 of the base 220. The bottom 202 of the base 220 may extend from the first side 205 to the second side 206 for approximately 26 millimeters, for example, between the first and second saddles 230 and 240.

The first saddle 230 includes a generally arcuate seat 232 and sidewalls that support the seat 232 and that define an opening 234 extending from the top 201 through the first saddle 230 to the bottom 202 and between the seat 232 and the base 220. The first saddle 230 may have any suitable dimensions.

For one embodiment, the first saddle 230 may have a height from the top 201 to the bottom 202 of approximately 16 millimeters, for example, and may extend outward from the base 220 toward the first side 205 for approximately 14 millimeters, for example. The seat 232 may have a height from the top 201 to the bottom 202 of approximately 11 millimeters, for example, and the outer surface of the seat 232 may be curved from the top 201 to the bottom 202 at a radius of approximately 12.5 millimeters, for example. The seat 232 may have a width from the front 203 to the rear 204 of approximately 13 millimeters, for example, near the first side 205 and taper to a width of approximately 12 millimeters, for example, near the bottom 202. The seat 232 may define the opening 234 with a width from the front 203 to the rear 204 of approximately 8.25 millimeters, for example.

As illustrated in FIGS. 4 and 5, the first service line 110 may be mounted against the seat 232 and secured to the seat 232 with a tie 112 having a head 114 and an elongated strap 116 attached to the head 114. The head 114 includes a latch having a suitable ratchet positioned in relation to an opening for engaging at least one of a plurality of sloping teeth on one side of the strap 116.

To secure the first service line 110 to the seat 232, the tail end of the strap 116 may be inserted through the opening 234 of the saddle 230, wrapped around the perimeter of the first service line 110, and inserted into and routed through the opening of the head 114 until the first service line 110 is secured to the seat 232. As the ratchet of the head 114 engages the teeth of the strap 116 and permits the strap 116 to be routed through the opening of the head 114 in one direction only, the first service line 110 remains clamped to the seat 232.

The second saddle 240 includes a generally arcuate seat 242 and sidewalls that support the seat 242 and that define an opening 244 from the top 201 through the second saddle 240 to the bottom 202 and between the seat 242 and the base 220. The second saddle 240 may have any suitable dimensions.

For one embodiment, the second saddle 240 may have a height from the top 201 to the bottom 202 of approximately 16 millimeters, for example, and may extend outward from the base 220 toward the second side 206 for approximately 14 millimeters, for example. The seat 242 may have a height from the top 201 to the bottom 202 of approximately 11 millimeters, for example, and the outer surface of the seat 242 may be curved from the top 201 to the bottom 202 at a radius of approximately 12.5 millimeters, for example. The seat 242 may have a width from the front 203 to the rear 204 of approximately 13 millimeters, for example, near the second side 206 and taper to a width of approximately 12 millimeters, for example, near the bottom 202. The seat 242 may define the opening 244 with a width from the front 203 to the rear 204 of approximately 8.25 millimeters, for example.

As illustrated in FIGS. 4 and 5, the second service line lline 120 may be mounted against the seat 242 and secured to the seat 242 with a tie 122 having a head 124 and an elongated strap 126 attached to the head 124. The head 124 includes a latch having a suitable ratchet positioned in relation to an opening for engaging at least one of a plurality of sloping teeth on one side of the strap 126.

To secure the second service line 120 to the seat 242, the tail end of the strap 126 may be inserted through the opening 244 of the saddle 240, wrapped around the perimeter of the second service line 120, and inserted into and routed through the opening of the head 124 until the second service line 120 is secured to the seat 242. As the ratchet of the head 124 engages the teeth of the strap 126 and permits the strap 126 to be routed through the opening of the head 124 in one direction only, the second service line 120 remains clamped to the seat 242.

Because the heads 114 and 124 may engage the teeth of the straps 116 and 126, respectively, at any suitable location along the length of the straps 116 and 126, respectively, the ties 112 and 122 are self-sizing and may be used to secure the first and second service lines 110 and 120, respectively, despite their respective perimeter sizes. In this manner, the mount 200 may be used to mount a variety of sizes and types of service lines including, but not limited to, a pipe, cable, line, tube, wire, hose, conduit, and a bundle of any such service lines.

The first and second service lines 110 and 120 may be secured to the mount 200 with relative ease as the ties 112 and 122, respectively, may be used to secure the first and second service lines 110 and 120, respectively, by hand or with a suitable tensioning tool. After the first and second service lines 110 and 120 are secured to the mount 200, any excess portion of the straps 116 and 126 routed through the opening of the heads 114 and 124, respectively, may be cut as illustrated in FIGS. 4 and 5. Suitable tensioning and cut-off tools are available, for example, from Tyton Corporation of Milwaukee, Wis. and disclosed, for example, in U.S. Pat. No. 4,793,385 and U.S. Pat. No. 4,997,011.

The mount 200 also includes a standoff or spacer portion 260 for defining a spaced relation between the mounting portion 210 and the support structure 150 when the mount 200 is secured to the support structure 150. The spacer portion 260 is generally cylindrical in shape and is positioned on the top surface of the base 220 such that the longitudinal axis of the spacer portion 260 is generally normal to the top surface of the base 220. The spacer portion 260 has a mouth 262 at the top 201 and defines an interior region 264 that exposes at least a portion of the top surface of the base 220. The spacer portion 260 may have any suitable dimensions, and for one embodiment the spacer portion 260 may extend approximately 30 millimeters, for example, from the bottom 202 of the base 220 and may have a width at the mouth 262 of approximately 24 millimeters, for example, from the front 203 to the rear 204.

Figure 11:
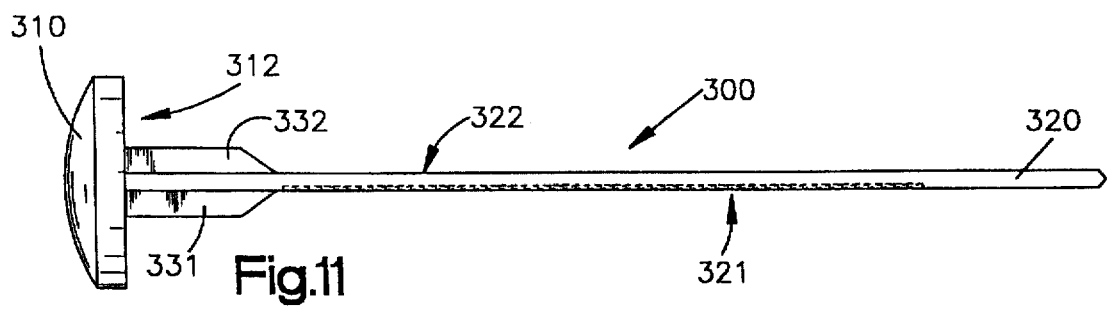
FIG. 11 is a side, elevational view of a tie for the mount assembly of FIGS. 4–6.
Figure 12:
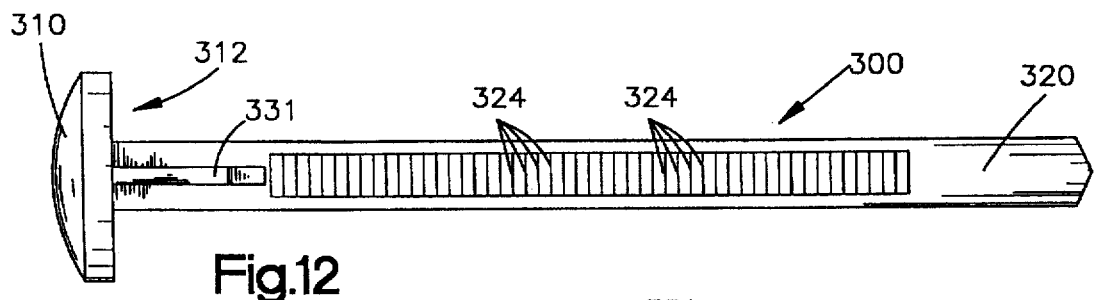
FIG. 12 is a front, elevational view of the tie of FIG. 11.
Figure 13:
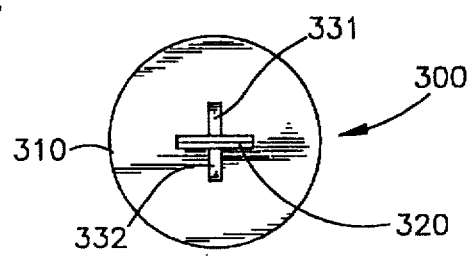
FIG. 13 is a bottom, plan view of the tie of FIG. 11.

The mount 200 may be secured to the support structure 150, as illustrated in FIG. 5, with the latch 250 and the tie 300. As illustrated in FIGS. 11, 12, and 13, the tie 300 includes a generally circular head 310 and an elongated strap 320 attached at an end of the strap 320 to extend from a bottom 312 of the head 310 in a direction generally normal to the bottom 312 of the head 310. The strap 320 has a first side 321 and a second side 322. The first side 321 is molded with a plurality of sloping teeth 324, as illustrated in FIGS. 11 and 12. The tie 300 also includes ribs 331 and 332 extending from the bottom 312 of the head 310 in a direction generally normal to the bottom 312 of the head 310. The ribs 331 and 332 also extend from the first side 321 and from the second side 322, respectively, in a direction generally normal to the first side 321 and the second side 322, respectively, as illustrated in FIGS. 11, 12, and 13.

The tie 300 may have any suitable dimensions. For one embodiment, the head 310 may have a thickness of approximately 7 millimeters, for example, and the circular surface at the bottom 312 of the head 310 may have a diameter in the range of approximately 20 millimeters to approximately 25 millimeters, for example. The strap 320 may have a width of approximately 7.5 millimeters, for example, a length in the range of approximately 100 millimeters to approximately 150 millimeters, for example, and a thickness of approximately 1.5 millimeters, for example. The teeth 324 may extend in length on the first side 321 of the strap 320 for approximately 60 millimeters to approximately 110 millimeters, for example, depending on the length of the strap 320. Each rib 331 and 332 may have a length of approximately 19.5 millimeters, a width of approximately 3.0 millimeters, and a thickness of approximately 1.5 millimeters, for example. As illustrated in FIGS. 11 and 12, the width of the ribs 331 and 332 may each taper to the surface of the first side 321 and to the second side 322, respectively, for approximately 5.0 millimeters of the overall length of the ribs 331 and 332.

The latch 250 is positioned along the longitudinal axis of the spacer portion 260 and is exposed in the interior region 264 of the spacer portion 260. The latch 250 includes a suitable ratchet 252 positioned in relation to an opening 254 for engaging at least one of the plurality of teeth 324 on the first side 321 of the strap 320. The opening 254 extends from the top surface of the base 220 exposed in the interior region 264 and through the base 220 to the bottom 202. The latch 250 may have any suitable orientation with respect to the longitudinal axis of the spacer portion 260. For one embodiment, the latch 250 may be rotated about the longitudinal axis of the spacer portion 260 approximately ninety degrees from the orientation illustrated in FIGS. 9 and 10, for example.

To secure the mount 200 to the support structure 150, the tail end of the strap 320 may be inserted at the second surface 152 of the support structure 150 through an opening that extends through the support structure 150 to the first surface 151, through the mouth 262 and the interior region 264, and into the opening 254 of the latch 250, as illustrated in FIGS. 4 and 5. The tail end of the strap 320 may then be routed through the opening 254 and pulled or tensioned to hold the bottom 312 of the head 310 of the tie 300 against the second surface 152 of the support structure 150 and the top 201 of the spacer portion 260 against the first surface 151 of the support structure 150, as illustrated in FIG. 5. As the ratchet 252 engages the teeth 324 of the strap 320 and permits the strap 320 to be routed through the opening 254 in one direction only, the mount 200 remains secured against the first surface 151 of the support structure 150.

Because the latch 250 may engage the teeth 324 of the strap 320 at any suitable location along the length of the strap 320, the tie 300 is self-sizing and may be used to secure the mount assembly 100 to the support structure 150 despite the thickness of the support structure 150 or the size of the spacer portion 260.

The mount 200 may be secured to the support structure 150 with relative ease as the tie 300 may be used to secure the mount 200 to the support structure 150 by hand or with a suitable tensioning tool. After the mount assembly 100 is secured to the support structure 150, any excess portion of the strap 320 routed through the mount assembly 100 may be cut. Suitable tensioning and cut-off tools are available, for example, from Tyton Corporation of Milwaukee, Wis. and disclosed, for example, in U.S. Pat. No. 4,793,385 and U.S. Pat. No. 4,997,011.

For another embodiment, the second side 322 of the strap 320 may be molded with a plurality of sloping teeth in addition to those on the first side 321 of the strap 320. In this manner, the tie 300 may be inserted in the opening 254 without regard to the orientation of the tie 300 to help facilitate the securing of the mount 200 to the support structure 150.

When the mount 200 is secured to the support structure 150, the spacer portion 260 provides a clearance area for the service lines 110 and 120 from the first surface 151 of the support structure 150. The spacer portion 260 also provides a clearance area for the service lines 110 and 120 from any obstructions, such as any bolt heads for example, extending from the first surface 151 of the support structure 150. Because the spacer portion 260 isolates the service lines 110 and 120 from the support structure 150, the mount assembly 100 is self-cleaning as debris, such as salt, dirt, and sand for example, is prevented from gathering between the service lines 110 and 120 and the support structure 150. In this manner, any chafing or corrosion of the service lines 110 and 120 and the support structure 150 is minimized or avoided.

The mount 200, the ties 112 and 122, and the tie 300 may be formed of any suitable material. For one embodiment, the mount 200, the ties 112 and 122, and the tie 300 may each be formed of nylon, such as type 6-6 nylon for example, to provide for a relatively heat-stabilized, rust-free mount assembly 100 that is protected from ultraviolet (UV) radiation.

As illustrated in FIG. 6, the mount assembly 100 may be stacked with another mount assembly 500 to mount a third service line 510 and a fourth service line 520 to the support structure 150. The mount assembly 500 is similarly constructed as mount assembly 100 and includes a spacer portion 660 and a mounting portion having a latch 650.

Figure 8:
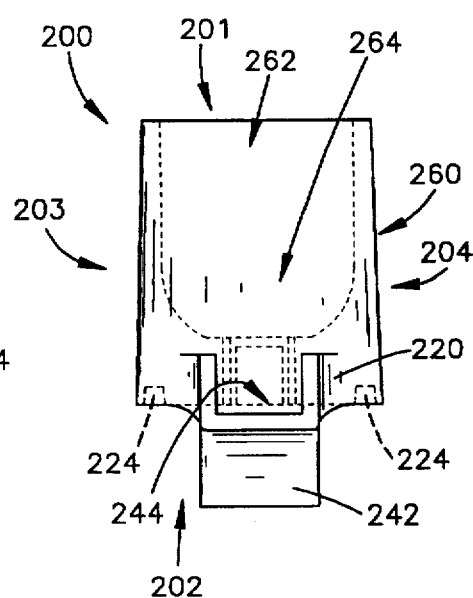
FIG. 8 is a side, elevational view of the mount of FIG. 7.
Figure 9:
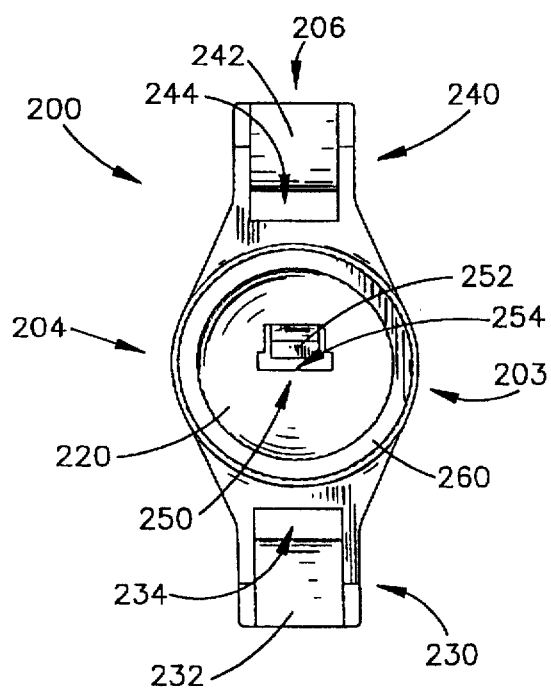
FIG. 9 is a top, plan view of the mount of FIG. 7.
Figure 10:
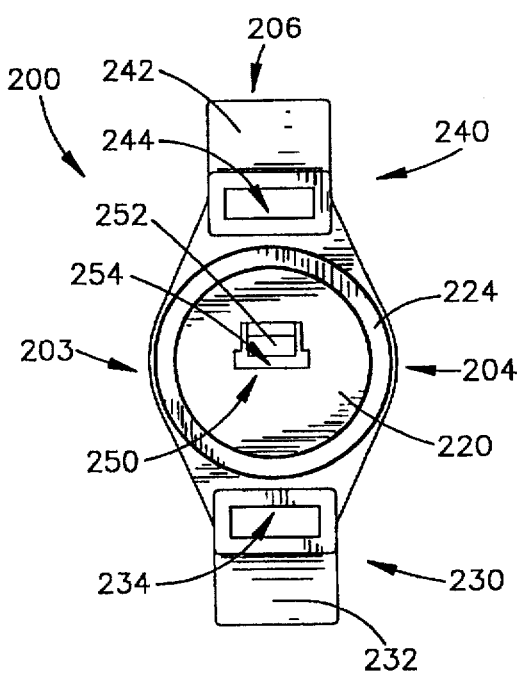
FIG. 10 is a bottom, plan view of the mount of FIG. 7.

To help facilitate the stacking of the mount assemblies 100 and 500, the base 220 of the mount 200 may be molded with an annular groove 224 at the bottom 202, as illustrated in FIGS. 7, 8, and 10. The mouth of the spacer portion 660 may be mated with the annular groove 224 of the mount assembly 100 and allows the latch 250 to extend into an interior region 664 of the spacer portion 660 in stacking the mount assembly 100 with the mount assembly 500, as illustrated in FIG. 6.

The stacked mount assemblies 100 and 500 may be secured to the support structure 150 by aligning the latch 650 of the mount assembly 500 with the latch 250 of the mount assembly 100 and routing the strap 320 of the tie 300 through both latches 250 and 650, as illustrated in FIG. 6. As the tie 300 is self-sizing as discussed above, the tie 300 may be used to secure one or mount assemblies to the support structure 150 despite the thickness of the support structure 150 or the number of mount assemblies to be mounted to the support structure 150. The spacer portion 660 of the mount assembly 500 provides a clearance area to help position the service lines 510 and 520 in relation to the service lines 110 and 120.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method of mounting a service line to a support structure with a mount and a tie, the method comprising the steps of:

a) securing the service line to a saddle of the mount;

b) inserting a strap of the tie through an opening of the support structure; and c) latching the strap of the tie with a latch of the mount after the strap has been inserted through the opening of the support structure to secure the mount to the support structure.

2. The method of claim 1, wherein the inserting step (b) includes the step of inserting the strap of the tie through a spacer to define a spaced relation between the support structure and the service line secured to the mount.

3. The method of claim 1, wherein the strap of the tie has a plurality of sloping teeth; and wherein the latching step (c) includes the step of inserting the strap in a latch opening of the latch such that a ratchet positioned in relation to the latch opening engages at least one tooth of the strap.

4. The method of claim 1, wherein the tie includes a head coupled to an end of the strap; and wherein the latching step (c) includes the step of tensioning the strap of the tie such that the head and the mount are held against opposing surfaces of the support structure to secure the mount to the support structure.

5. The method of claim 1, wherein the securing step (a) includes the step of inserting another tie through a saddle opening of the saddle and wrapping the other tie around the service line to secure the service line against a seat of the saddle.

6. The method of claim 1, comprising the step of securing another service line to another saddle of the mount.

7. The method of claim 1, comprising the step of mating, in a groove formed in the mount, another mount having at least one other secured service line.

8. The method of claim 1, wherein the support structure is a frame rail of an over-the-highway truck or tractor.

9. A method of mounting a service line to a support structure with a mount and a tie, the method comprising the steps of:

a) securing the service line to a saddle of the mount;

b) inserting a strap of the tie through an opening of the support structure, the strap of the tie having a plurality of sloping teeth;

c) inserting the strap of the tie through a mouth of a spacer of the mount; and d) inserting the strap in a latch opening of the mount such that a ratchet positioned in relation to the latch opening engages at least one tooth of the strap to secure the mount to the support structure in a spaced relation defined by the spacer.

10. The method of claim 9, wherein the tie includes a head coupled to an end of the strap; and wherein the inserting step (d) includes the step of tensioning the strap of the tie such that the head and the mount are held against opposing surfaces of the support structure to secure the mount to the support structure.

11. The method of claim 9, wherein the securing step (a) includes the step of inserting another tie through a saddle opening of the saddle and wrapping the other tie around the service line to secure the service line against a seat of the saddle.

12. The method of claim 9, comprising the step of securing another service line to another saddle of the mount.

13. The method of claim 9, comprising the step of mating, in a groove formed in the mount, another mount having at least one other secured service line.

14. The method of claim 9, wherein the support structure is a frame rail of an over-the-highway truck or tractor.

15. A mount assembly for mounting a service line to a support structure, the mount assembly comprising:

a) a tie having a strap for insertion through an opening of such support structure and a head for engagement with such structure, the strap having a plurality of sloping teeth; and b) a mount for supporting such service line, the mount including:

i) a saddle for locating such service line relative to the mount, ii) a latch coupled to the saddle for receiving the strap when inserted through such opening of such support structure and for engaging at least one tooth of the received strap to secure the mount to such support structure; and iii) a spacer portion for engagement with such support structure on a side opposite the head and maintaining such service line spaced from such support structure.

16. The mount assembly of claim 15, wherein the tie head is coupled to an end of the strap for securing the mount to the support structure when the strap is tensioned by the latch to hold the head and the mount against opposing surfaces of the support structure.

17. The mount assembly of claim 15, wherein the latch includes a latch opening and a ratchet positioned in relation to the latch opening, the latch being for receiving the strap of the tie in the latch opening such that the ratchet engages at least one tooth of the strap.

18. The mount assembly of claim 15, wherein the mount assembly includes another tie for connecting such service line to the saddle by inserting the other tie through a saddle opening and wrapping the other tie around such service line to secure such service line to the saddle.

19. The mount assembly of claim 15, wherein the mount includes another saddle coupled to the latch for securing another service line to the mount.

20. The mount assembly of claim 15, wherein the tie and the mount are each formed of nylon.

21. The mount assembly of claim 15, in combination with the support structure, wherein the support structure is a frame rail of an over-the-highway truck or tractor.

22. A mount assembly for connecting a service line to a support structure, the mount assembly comprising:

a) a headed flexible tie for insertion through an opening of such support structure; and, b) a mount for supporting such service line, the mount including:

i) a base, ii) a saddle coupled to the base for locating a connected service line relative to the mount, iii) a latch supported by the base for receiving the tie when inserted through such opening of such support structure and for securing the mount to such support structure with the tie, and iv) a spacer coupled to the base for defining a spaced relation between the support structure and such service line when connected to the mount, the spacer having a mouth and defining an interior region exposing the latch through the mouth such that the tie may be inserted through the mouth of the spacer and received by the latch to fix the mount to such support structure with the tie head and the mount on opposite sides of such support structure.

23. The mount assembly of claim 22, wherein the saddle includes a seat and defines a saddle opening between the seat and the base, and wherein the mount assembly includes another tie for mounting such service line to the saddle by inserting the other tie through the saddle opening and wrapping the other tie around the service line to secure such service line against the seat of the saddle.

24. The mount assembly of claim 22, wherein the base of the mount defines a groove surrounding the latch for mating with another mount for securement of at least one other service line.

25. The mount assembly of claim 22, wherein the base of the mount defines a groove surrounding the latch for mating with another mount having at least one other secured service line.

26. The mount assembly of claim 22, wherein the spacer is cylindrical in shape.

27. The mount assembly of claim 22, wherein the tie and the mount are each formed of nylon.

28. The mount assembly of claim 22, in combination with the support structure, wherein the support structure is a frame rail of an over-the-highway truck or tractor.

29. In combination with an over-the-highway truck or tractor having a frame rail and service lines connected to and supported by the frame rail, improved service line mountings each comprising:

a) a support having a component engaging surface in engagement with a first surface of the frame rail;

b) the support also having at least one service line surface in contact with an associated one of the service lines;

c) the support further including structure securing the associated service line in engagement with the service line surface and maintaining the associated service line in spaced relationship with the frame rail;

d) a support tie having a head engaging a second surface of the frame rail, wherein the second surface of the frame rail opposes the first surface of the frame rail; and e) the tie including a strap extending through an opening in the frame rail and secured to the support, the strap being tensioned to hold the support against the first surface of the frame rail and the head against the second surface of the frame rail.

30. In combination with an over-the-highway truck or tractor having a frame rail and service lines connected to and supported by the frame rail, improved service line mountings each comprising:

a) a support having a component engaging surface in engagement with a first surface of the frame rail;

b) the support also having at least one service line surface in position locating connection to an associated one of the service lines;

c) the support further including structure securing the associated service line to the support in a position located by the service line surface to maintain the associated service line in spaced relationship with the frame rail;

d) a support tie having a head in a position locating connection with a second surface of the frame rail, wherein the second surface of the frame rail opposes the first surface of the frame rail; and e) the tie including a strap extending through an opening in the frame rail and secured to the support, the strap being tensioned to hold the support against the first surface of the frame rail and the head against the second surface of the frame rail.

31. A method of mounting a service line to a support structure with a mount and a tie, the method comprising the steps of:
   a) securing the service line to a saddle of the mount;
   b) inserting a strap of the tie through an opening of the support structure; and
   c) fixedly engaging the strap of the tie with the mount after the strap has been inserted through the opening of the support structure to secure the mount to the support structure.

32. The method of claim 31, wherein the inserting step (b) includes the step of inserting the strap of the tie through a spacer to define a spaced relation between the support structure and the service line secured to the mount.

33. The method of claim 31, wherein the strap of the tie has a plurality of sloping teeth; and
   wherein the fixedly engaging step (c) includes the step of inserting the strap in an opening in the mount such that a ratchet positioned in relation to the mount opening engages at least one tooth of the strap.

34. The method of claim 31, wherein the tie includes a head coupled to an end of the strap; and
   wherein the fixedly engaging step (c) includes the step of tensioning the strap of the tie such that the head and the mount are held against opposing surfaces of the support structure to secure the mount to the support structure.

35. The method of claim 31, further including the step of securing another service line to another saddle of the mount.

36. The method of claim 31, comprising the step of mating the mount with another mount having at least one other secured service line.

37. The method of claim 31, wherein the support structure is a frame rail of an over-the-highway truck or tractor.

38. A method of mounting a service line to a support structure with a mount and a tie, the method comprising the steps of:
   a) securing the service line to a saddle of the mount;
   b) inserting a strap of the tie through an opening of the support structure, the strap of the tie having a plurality of sloping teeth;
   c) inserting the strap of the tie through a mouth of a spacer of the mount; and
   d) inserting the strap into an opening in the mount such that a ratchet portion of the mount engages at least one tooth of the strap to secure the mount to the support structure in a spaced relation defined by the spacer.

39. The method of claim 38, wherein the tie includes a head coupled to an end of the strap; and
   wherein the inserting step (d) includes the step of tensioning the strap of the tie such that the head and the mount are held against opposing surfaces of the support structure to secure the mount to the support structure.

40. The method of claim 38, wherein the support structure is a frame rail of an over-the-highway truck or tractor.

41. A mounting apparatus for connecting a service line to a support comprising:
   a) a tubular body having walls defining a through passage extending from a support engagement surface at one end to a remote end;
   b) a ratchet element extending from one of the walls at an acute angle with the one wall as measured in the direction of the remote end;
   c) the body including a conduit support portion including an internal through slot for receipt of a service line connector strap;
   d) the support portion including an exterior service line location surface; and,
   e) a tie having an enlarged head and a projecting toothed, flexible, strap for extension through the passage and coacting locking engagement with the ratchet element whereby to secure the apparatus to such support when in use with the head and body on opposite sides of such support and the strap extending through a hole in such support.

42. The apparatus of claim 41 wherein the body includes a second conduit support portion having another through slot and another service line location surface.

43. The apparatus of claim 42 wherein the remote end includes surfaces to coact with the support engagement surface of a second and like body in stacked and mating relationship.

44. The apparatus of claim 41 wherein the remote end includes surfaces to coact with the support engagement surface of a second and like body in stacked and mating relationship.

45. An over-the-highway truck or tractor vehicle comprising:
   a) an apertured frame rail;
   b) a service line extending along the frame rail; and,
   c) structure connecting the service line to the frame rail in spaced relationship, the structure comprising:
      i) a tie having a head engaging a surface of the frame rail and an elongate flexible stem projecting through the frame rail aperture;
      ii) a service line holder supportively connected to the service line; and,
      iii) the stem and holder including portions establishing a unidirectional interlock with the stem projecting into the holder and the holder positioned in engagement with an opposed surface of the frame rail and the interlock maintaining the head and the holder in opposed engagement with the frame rail whereby the service line is secured in spaced relationship with the frame rail.

46. The vehicle of claim 45 further including a service line connector strap and wherein the holder includes:
   a) a tubular body having walls defining a through passage extending from a rail engagement surface at one end to a remote end;
   b) a ratchet element extending from one of the walls at an acute angle with the one wall as measured in the direction of the remote end, the ratchet coacting with the stem to provide the unidirectional interlock;
   c) the body including a conduit support portion including an internal through slot, the service line connector strap extending through the slot;
   d) the support portion including an exterior service line location surface; and, e) the strap securing the service line relative to the body.

47. The vehicle of claim 46 wherein the body includes a second conduit support portion having another through slot and another service line location surface.

48. The vehicle of claim 47 wherein the body remote end includes surfaces coacting with the support engagement surface of a second and like body in stacked and mating relationship and a second service line is connected to the like body.

49. The vehicle of claim 46 wherein the body remote end includes surfaces coacting with the support engagement surface of a second and like body in stacked and mating relationship and a second service line in connected to the like body.

50. The vehicle of claim 45 wherein there is a second service line secured to the holder.

51. The vehicle of claim 50 wherein there is a second holder secured to the first holder and a further service line is connected to the second holder.

52. The vehicle of claim 51 wherein the second holder is secured by the stem.

53. The vehicle of claim 45 wherein there is a second holder secured to the first holder and a further service line is connected to the second holder.

54. The vehicle of claim 53 wherein the second holder is secured by the stem.

55. In combination with an over-the-highway truck or tractor having a frame rail and service lines connected to and supported by the frame rail, improved service line mountings each comprising:
   a) a support having an engagement surface in engagement with a first surface of the frame rail;
   b) the support also having at least one service line surface in position locating connection to an associated one of the service lines;
   c) the support further including structure securing the associated service line to the support in a position located by the service line surface to maintain the associated service line in spaced relationship with the frame rail;
   d) a support tie having a head in a position locating connection with a selected one of the support and a second surface of the frame rail, wherein the second surface of the frame rail opposes the first surface of the frame rail; and
   e) the tie including a strap extending through openings in the frame rail and the support, the strap being tensioned to hold the support against the first surface of the frame rail and the head against the second surface of the frame rail and secured by coaction of the tie and a locking structure.

56. A mount assembly for mounting a service line to a support structure, the mount assembly comprising:
   a) a tie having a strap for insertion through an opening of such support structure, the strap having a plurality of sloping teeth;
   b) a mount for supporting such service line, the mount including:
      i) a saddle for securing such service line to the mount; and,
      ii) a latch coupled to the saddle for receiving the strap inserted through the opening of such support structure and for engaging at least one tooth of the received strap to secure the mount to such support structure; and,
   c) the mount defining a groove surrounding the latch for mating with another mount having at least one other secured service line.

57. A mount assembly for mounting a service line to a support structure, the mount assembly comprising:
   a) a tie having a strap for insertion through an opening of such support structure, the strap having a plurality of sloping teeth; and,
   b) a mount for supporting such service line, the mount including:
      i) a saddle for securing such service line to the mount,
      ii) a latch coupled to the saddle for receiving the strap inserted through the opening of such support structure and for engaging at least one tooth of the received strap to secure the mount to such support structure; and,
      iii) a spacer coupled to the latch for defining a spaced relation between such support structure and such service line when secured to the mount.

58. The mount assembly of claim 57, wherein the spacer has a mouth and defines an interior region exposing the latch through the mouth such that the strap may be inserted through the mouth of the spacer and received by the latch.

59. The mount assembly of claim 58, wherein the spacer is cylindrical in shape.

60. A mount assembly for mounting a service line to a support structure, the mount assembly comprising:
   a) a tie for insertion through an opening of such support structure;
   b) a mount for supporting such service line, the mount including:
      i) a base,
      ii) a saddle coupled to the base for securing such service line to the mount,
      iii) a latch supported by the base for receiving the tie when inserted through such opening of such support structure and for securing the mount to such support structure with the tie, and
      iv) a spacer coupled to the base for defining a spaced relation between such support structure and such service line when secured to the mount, the spacer having a mouth and defining an interior region exposing the latch through the mouth such that the tie may be inserted through the mouth of the spacer and received by the latch;
   c) the tie including a strap for insertion through such opening of such support structure, the strap having a plurality of sloping teeth; and
   d) the latch including a latch opening and a ratchet positioned in relation to the latch opening, the latch being for receiving the strap in the latch opening such that the ratchet engages at least one tooth of the strap.

61. A mount assembly for mounting a service line to a support structure, the mount assembly comprising:
   a) a tie for insertion through an opening of such support structure;
   b) a mount for supporting such service line, the mount including:
      i) a base,
      ii) a saddle coupled to the base for securing such service line to the mount,
      iii) a latch supported by the base for receiving the tie inserted through such opening of such support structure and for securing the mount to such support structure with the tie, and, iv) a spacer coupled to the base for defining a spaced relation between such support structure and such service line when secured to the mount, the spacer having a mouth and defining an interior region exposing the latch through the mouth such that the tie may be inserted through the mouth of the spacer and received by the latch; and, c) the tie including a strap for insertion through such opening of such support structure and including a head coupled to an end of the strap for securing the mount to the support structure when the strap is tensioned by the latch to hold the head and the mount against opposing surfaces of such support structure.

* * * * *